United States Patent [19]

Greanias et al.

[11] Patent Number: 5,007,085

[45] Date of Patent: Apr. 9, 1991

[54] REMOTELY SENSED PERSONAL STYLUS

[75] Inventors: Evon C. Greanias, Chevy Chase; Robert L. Donaldson, Annapolis, both of Md.

[73] Assignee: International Business Machines Corporation, Armonk, N.Y.

[21] Appl. No.: 264,409

[22] Filed: Oct. 28, 1988

[51] Int. Cl.$^5$ .................................................. H04L 9/32
[52] U.S. Cl. .......................................... 380/25; 380/23; 380/49; 178/18; 340/706; 340/707; 340/710; 340/825.31; 340/825.34
[58] Field of Search .................................. 178/18-20; 341/20, 21; 340/706, 707, 710, 825.31, 825.34

[56] References Cited

U.S. PATENT DOCUMENTS

| | | | |
|---|---|---|---|
| 4,295,039 | 10/1981 | Stuckert | 235/380 |
| 4,429,607 | 2/1984 | Meno | 341/20 X |
| 4,458,238 | 7/1984 | Learn | 341/20 |
| 4,565,999 | 1/1986 | King et al. | 340/706 |
| 4,578,671 | 3/1986 | Flowers | 340/636 |
| 4,578,674 | 3/1986 | Baker et al. | 178/18 X |
| 4,599,489 | 7/1986 | Cargile | 380/25 X |
| 4,628,541 | 12/1986 | Beavers | 455/603 |
| 4,649,373 | 3/1987 | Bland et al. | 341/22 |
| 4,654,648 | 3/1987 | Herrington et al. | 340/706 X |
| 4,670,989 | 6/1987 | Juengel | 340/707 X |
| 4,672,154 | 6/1987 | Rodgers et al. | 178/19 |
| 4,686,332 | 8/1987 | Greanias et al. | 178/19 |
| 4,697,050 | 9/1987 | Farel et al. | 178/19 X |
| 4,745,402 | 5/1988 | Auerbach | 340/706 X |
| 4,751,741 | 6/1988 | Mochinaga et al. | 178/18 X |
| 4,754,268 | 6/1988 | Mori | 340/706 X |
| 4,761,637 | 8/1988 | Lucas et al. | 341/5 |
| 4,777,329 | 10/1988 | Mallicoat | 340/706 X |
| 4,780,707 | 10/1988 | Selker | 340/706 X |
| 4,786,765 | 11/1988 | Yamanami et al. | 340/706 X |
| 4,796,019 | 1/1989 | Auerbach | 340/706 X |
| 4,814,552 | 3/1989 | Stefik et al. | 340/706 X |
| 4,819,267 | 4/1989 | Cargile et al. | 380/25 X |
| 4,848,496 | 7/1989 | Murakami et al. | 178/19 |

Primary Examiner—Stephen C. Buczinski
Assistant Examiner—Bernarr Earl Gregory
Attorney, Agent, or Firm—Jeffrey S. LaBaw

[57] ABSTRACT

A data processing system is disclosed which is equipped with a secure user friendly input system. The input system comprises an array of horizontal and vertical conductor supported on a flexible, transparent overlay membrane secured to the viewing surface of the display of an individual workstation and a remotely sensed personal stylus. The stylus is equipped to receive electromagnetic signals from the array and transmit signals containing information concerning the stylus position on the overlay and stylus ID to a receiver at the workstation. The input system also includes a control processor operating in stored program instructions which control the detection and log-on procedures for the remotely sensed personal stylus.

37 Claims, 6 Drawing Sheets

REMOTELY SENSED PERSONAL STYLUS

BACKGROUND OF THE INVENTION

This invention relates to improvements in the security of input data to digital computers. More particularly, it relates to a personal data entry stylus which simultaneously enters data into a computer system and transmits a security code which identifies the user and may optionally log the user on to the computer system.

In data processing systems, a central processor executes a sequence of program instructions in response to data supplied by an input device and displays the results of those program instructions to an output display device. A visual display device such as a scanned cathode ray tube display, a gas panel display, an array of light emitting diodes, a liquid crystal display panel, or other types of visual devices may be used to display the output from the computer system. While an alphanumeric text is frequently utilized as an output, a graphical representation of the data has been recognized as a powerful means for characterizing data. Frequently, the results displayed on the visual display device by the computer system will require the user to input additional data to the computer system. Human factor studies have shown that where the user can input data directly on the visual display screen itself, the greatest immediacy and accuracy between man and machine is achieved.

Various types of interactive input devices for use at the display surface have been provided in the prior art. One of the first devices was the light pen, which is an optical detector in a hand held stylus, which is placed against the face of a cathode ray tube. The location of the light pen is determined by detecting the coordinates of the dot of light which is the scanning raster of the display. A second interactive input device is a opaque graphic tablet, upon which a sheet of drawing paper might be placed for tracing with a stylus or other instrument. A horizontal wire grid and a vertical wire grid are embedded in the surface of the tablet which are driven with an electromagnetic signal. The computer system establishes the stylus position by receiving the grid signal through the stylus by way of a signal detector.

Yet another type of input device in the prior art is a mechanical deformation membrane which is placed over the display screen. The membrane is a transparent overlay which consists of two transparent conductor planes disposed on a flexible surface so that when the user mechanically displaces one of the conductor planes to touch the other by a finger or stylus touch, the conductors are brought into electrical contact with each other. Appropriate electronics and software are provided to translate the electrical signals generated by the finger or stylus touch to the position on the visual display.

However, the ease with which a user can input data into a computer system with these interactive input devices, also creates concerns about terminal and computer system security. One prior art security method describes a personal identification card which has an encoded combination of punched holes in it. The user places the card over a designated area on the CRT display screen and then places a light pen over the holes in the card while it is pressed against the the face of the display. The information registered by the light pen through the holes in the card will provide a security password to the computer system, thereby validating the user of the card as a legitimate user of the terminal. While this method addresses security at log-on, it does not provide security where a system is continuously in use by multiple users and no log-on and log-off procedures are followed. In addition, it is somewhat cumbersome to use both a card and light pen in conjunction with the display to provide the security password.

Other methods for providing security of a computer terminal such as standard identification numbers and passwords, as well as the use of a credit card device and reader have been used in the prior art. All of these methods and systems address the security of a system at log-on. In some situations, for example, at a hospital nurses station, it may be desirable to leave a system continuously running without the need for log-on/log-off procedures, yet maintain security so that only legitimate users may access the terminal. It would also be desirable to automatically identify the user of the terminal so that the data entered at the terminal may be associated with a particular user.

SUMMARY OF THE INVENTION

It is therefore an object of this invention to utilize a personal interactive stylus as an input device in conjunction with a computer display surface.

It is another object of the invention to provide a user friendly input system which controls access to a host processing system by means at an interactive stylus which transmits a security code to the terminal connected to the host system while simultaneously inputting information into the host system.

It is yet another object of the invention to associate the information inputted at a computer terminal with the owner of the personal interactive stylus which was used.

It is still another object of the invention to initiate a log-on to the system when the user brings the stylus near a computer terminal without the need for log-on/log-off procedures.

It is still yet another object of the invention to provide a remotely sensed interactive stylus which offers the user freedom of motion.

These and other objects will become clear from the following description.

The data processing system of this invention utilizes an input system which includes a remotely sensed interactive stylus. Unlike prior art systems, the stylus is not connected to the workstation terminal with a transmitting wire, but is a completely remote unit. The remotely sensed stylus includes an antenna for receiving electromagnetic signals radiated by an array of conductors, a code generator or other means for generating a unique security code which identifies the stylus and its user, a transmitter for transmitting both the security code to identify the stylus and the electromagnetic signals from the overlay array to identify the stylus location to the workstation, and a battery power source. The stylus may further include an amplifier which increases the amplitude of the overlay array signal and a switch responsive to the strength or the received overlay signal which activates the other components of the stylus. The interactive stylus is preferably equipped with either an infrared or a microwave radio frequency transmitter.

The remainder of the input system is physically connected to the individual workstation. The input system includes an input apparatus having an array of horizontal and vertical conductors capable of radiating electromagnetic signals such as a mechanical deformation membrane overlay. If a microwave or radio frequency transmitter is used in the stylus, the transparent conductor array in the overlay is preferably used as an antenna to receive the security code from the stylus. Alternatively, a separate microwave receiver can be used in the input system. If the infrared transmitter is used, a separate infrared receiver is included in the input system. The input system further includes a signal decoder to translate the signals from the stylus to the workstation, a microprocessor to control the signals radiated by the control overlay array.

DETAILED DESCRIPTION OF THE DRAWINGS

The invention can be utilized with the stylus detection system described in U.S. Pat. No. 4,686,332, entitled "Combined Finger Touch and Stylus Detection System For Use on the Viewing Surface of a Visual Display Device," by Evon C. Greanias, et al., which is incorporated herein by reference. The invention disclosed herein can be implemented on a stand-alone processor, such as a personal computer, or can be used with a host system with a variety of workstation terminals, such as might be found in a hospital data processing system.

Figure 1:
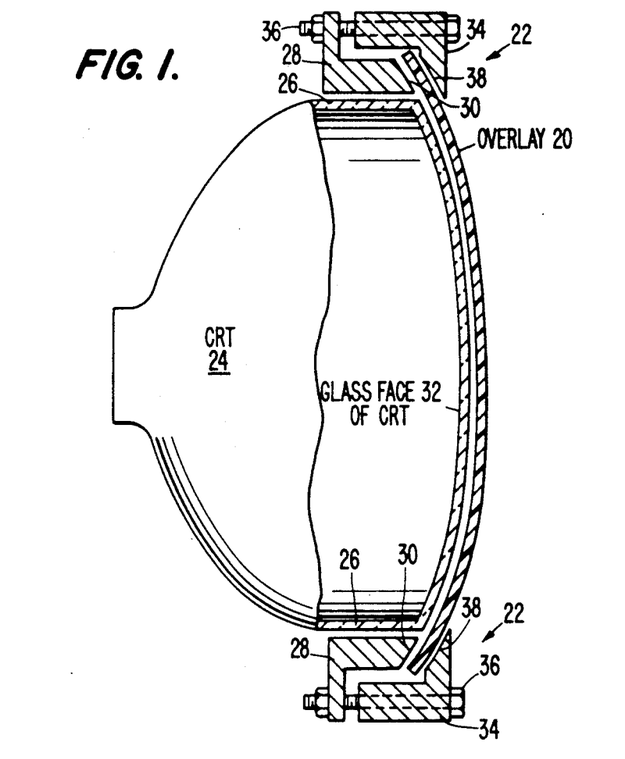
FIG. 1 is a side view of the transparent overlay in association with the cathode ray tube of an individual workstation.

The overlay is shown in FIG. 1, in association with the cathode ray tube display of an individual workstation terminal. The overlay consists of two sheets of durable transparent plastic with an array of horizontal transparent conductors imbedded in the first sheet, and an array of vertical transparent conductors imbedded in the second sheet. The overlay 20 can be mounted by means of a frame 22 onto the display surface 32 of the cathode ray tube 24. The mounting frame 22 consists of a base portion 28 which attaches to the side wall 26 of the cathode ray tube (CRT) 24. The overlay 20 is mechanically flexible and can be laid directly upon the surface 32 of the CRT 24, so that its edges overlap the surface 30 of the base portion 28 for the mounting frame 22. Mounting bolts 36 secure the clamping member 34 to the base portion 28. The overlay consists of an inner substrate 50 which is a sheet of polyethylene terephthalate, which is transparent, electrically insulative, and has a thickness of approximately 0.002 inches. An array of horizontal transparent conductors is deposited on the surface of the inner substrate 50, and are designated as Y1, Y2, Y3, etc. The transparent conductors can be composed of indium tin oxide, which is a well-known transparent conductor material. Deposited on the surface of the outer substrate 54 is a vertical array of transparent conductors designated X1, X2, X3, etc. These conductors are also composed of indium tin oxide. Both sets of conductors have a thickness of approximately 1000 angstroms, a width of approximately 0.025 inches, and a spacing of approximately 0.125 inches center to center.

Figure 2:
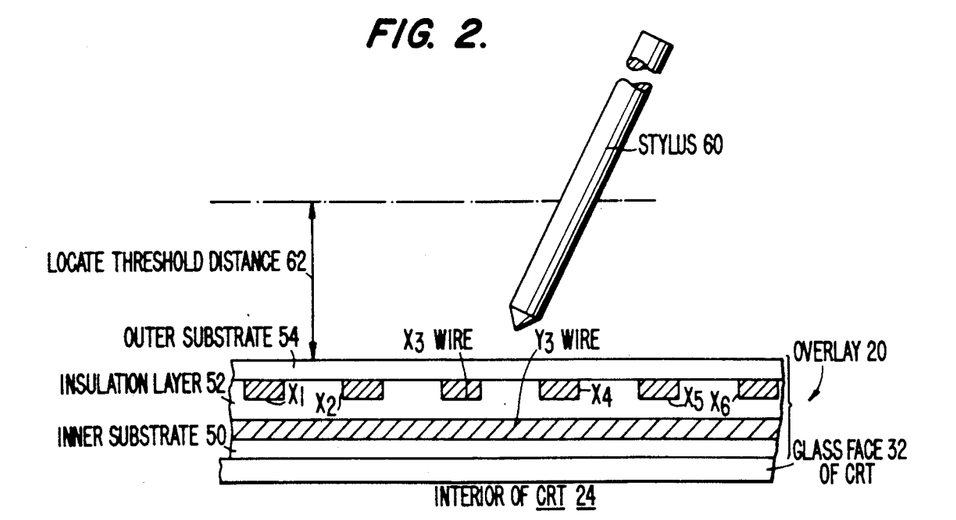
FIG. 2 is a side view of the overlay and the stylus illustrating the locate threshold distance.

FIG. 2 shows how the remotely sensed personal stylus 60 is activated when it is closer than the locate threshold distance 62. The X and/or Y conductors are driven by a 40 Khz oscillator driver, so that the X and Y conductors act as a transmitter of electromagnetic radiation, and the stylus 60 acts as a transponder responsive to that radiation. To transmit a signal, the oscillator selectively drives either the X conductors or the Y conductors in the overlay 20. The stylus 60 detects the signal via an antenna in the stylus tip. When the signal received from the overlay 20 has reached the threshold signal amplitude corresponding to the locate threshold distance 62, stylus 20 is activated and begins to transmit signals back to the input system concerning its location and identity. The X and Y conductors are driven so that the stylus 60 can be located almost instantaneously. This is done primarily by first driving the X conductors, comparing the amplitude of the signal received by the stylus 20 from each of the separate conductors X1, X2, X3, and then driving the Y conductors and comparing the signal strengths of Y1, Y2, Y3. A more complete explanation of the stylus detection method is given in the above incorporated Greanias, et al., patent, U.S. Pat. No. 4,686,332.

Figure 3:
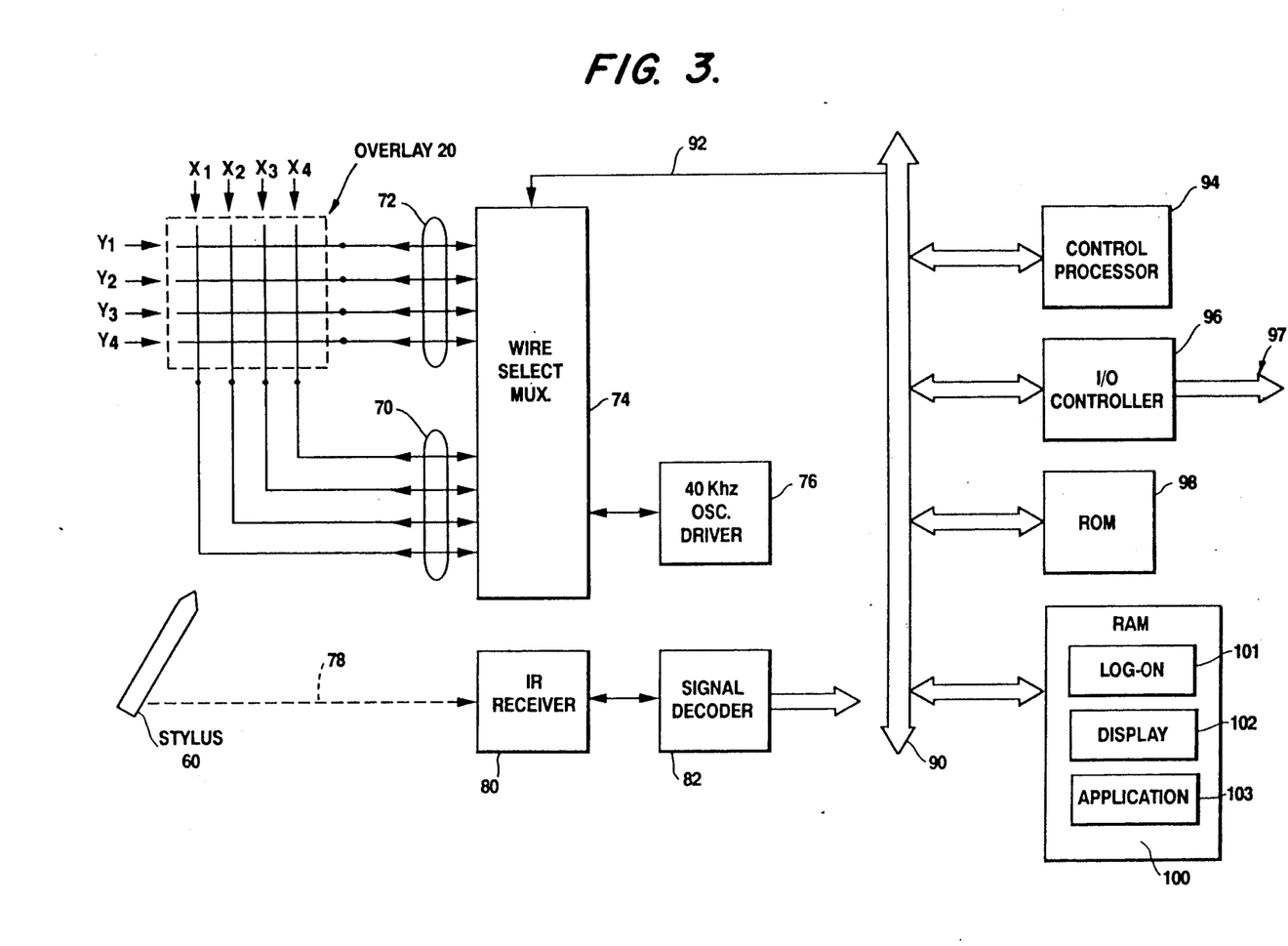
FIG. 3 is an architectural diagram of the functional elements of the input system provided with a personalized stylus using the infrared transmitter.

FIG. 3 shows an architectural diagram of the input system where the signals sent by the stylus 60 to the workstation are sent via an infrared signal. The vertical conductors X1-Xn are connected through the X-bus 70 to the wire select multiplexer 74 and the horizontal Y conductors Y1-Yn are connected through the Y-bus 72 to wire select multiplexer 74. The wire select multiplexer 74 is connected to the 40 Khz oscillator driver 76 which is used to drive the X-bus 70 and Y-bus 72 to send signals through the overlay 20. Infrared signals 78 sent by the stylus 60 are received at the workstation by the infrared receiver 80. The output of the infrared receiver 80 is connected to signal decoder 82 to processor address/data bus 90. A control input 92 to the wire select multiplexer is connected to the bus 90. The processor address/data bus 90 interconnects the control processor 94 with the I/O controller 96, the read only memory 98 and the random access memory 100. The I/O controller 96 has an I/O bus 97 which connects the input system to the I/O bus of a host processing system or stand alone processor such as the IBM Personal System/2. Program modules for log-on procedures 101, display control 102, and application software 103 are resident in RAM 100.

When the stylus 60 receives signals generated by the overlay 20, which exceed a predetermined threshold level, it is activated and transmits an infrared signal 78 to the infrared receiver 80. The received signal is then sent to the signal decoder which decodes the signal and sends it to the processor address/data bus 90. The control processor 94 utilizes modules of software 101, 102 and 103 in response to the decoded stylus signal to perform log-on, display control, and other application functions. The software may be resident at the input system RAM 100 or at the host processor system (not shown). If the proper coded signal is received by the input system from the stylus 60, log-on procedures are completed and the user has access to the host processor.

Figure 4:
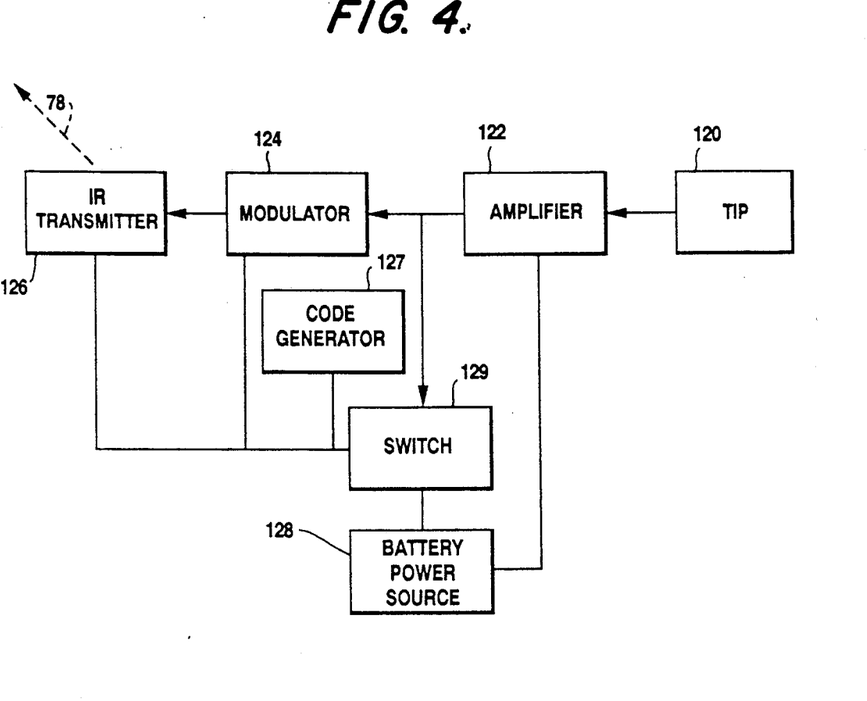
FIG. 4 is an architectural diagram of the functional elements of the personal stylus in the infrared embodiment.

FIG. 4 is a schematic diagram of the functional elements which must be provided within an infrared transmitting remote stylus 60. The stylus tip 120 act as an antenna to pick up the electromagnetic signal generated by the overlay 20. The overlay signal is increased at the signal amplifier 122 and frequency modulated at the signal modulator 124. In the preferred embodiment, the modulated signal frequency is proportional to the amplitude of the signal from the overlay 20; however, other ways of modulating the overlay signal are possible. The modulated signal is then sent via an infrared stylus signal 78 by the infrared transmitter 126 to the infrared receiver 80 at the input system.

The electronic elements of the remotely sensed stylus 60 are powered by a miniature power cell 128 similar to those used in digital watches. Alternatively, a rechargeable power cell may also be used. To conserve power, only the signal amplifier 122 is powered continuously. If the stylus 60 will not be used for a long period of time, a manual power switch (not shown) can be utilized to turn off power to all elements including the signal amplifier. Power is supplied to the other stylus components through a switch 129 which is turned on when the overlay signal received by the stylus tip 120 is greater than a threshold level to signify that the stylus 60 is within operating distance of the overlay 20. A preferred method of activating the switch 130 is the use of a threshold detector in the switch 129 which is capable of sensing both frequency and amplitude of the detected overlay signal. When the switch 129 activates the code generator 127 supplies a unique coded signal to the modulator 124 and infrared transmitter 126. The coded signal identifies the owner of the stylus 60 to the host processor. Once the coded signal is accepted by the host processor, the log-on procedure is completed by the software 100. One the user is logged on to the system, the coded signal of the stylus 60 can be used to identify the source of information used to alter system records or record new information.

Figure 5:
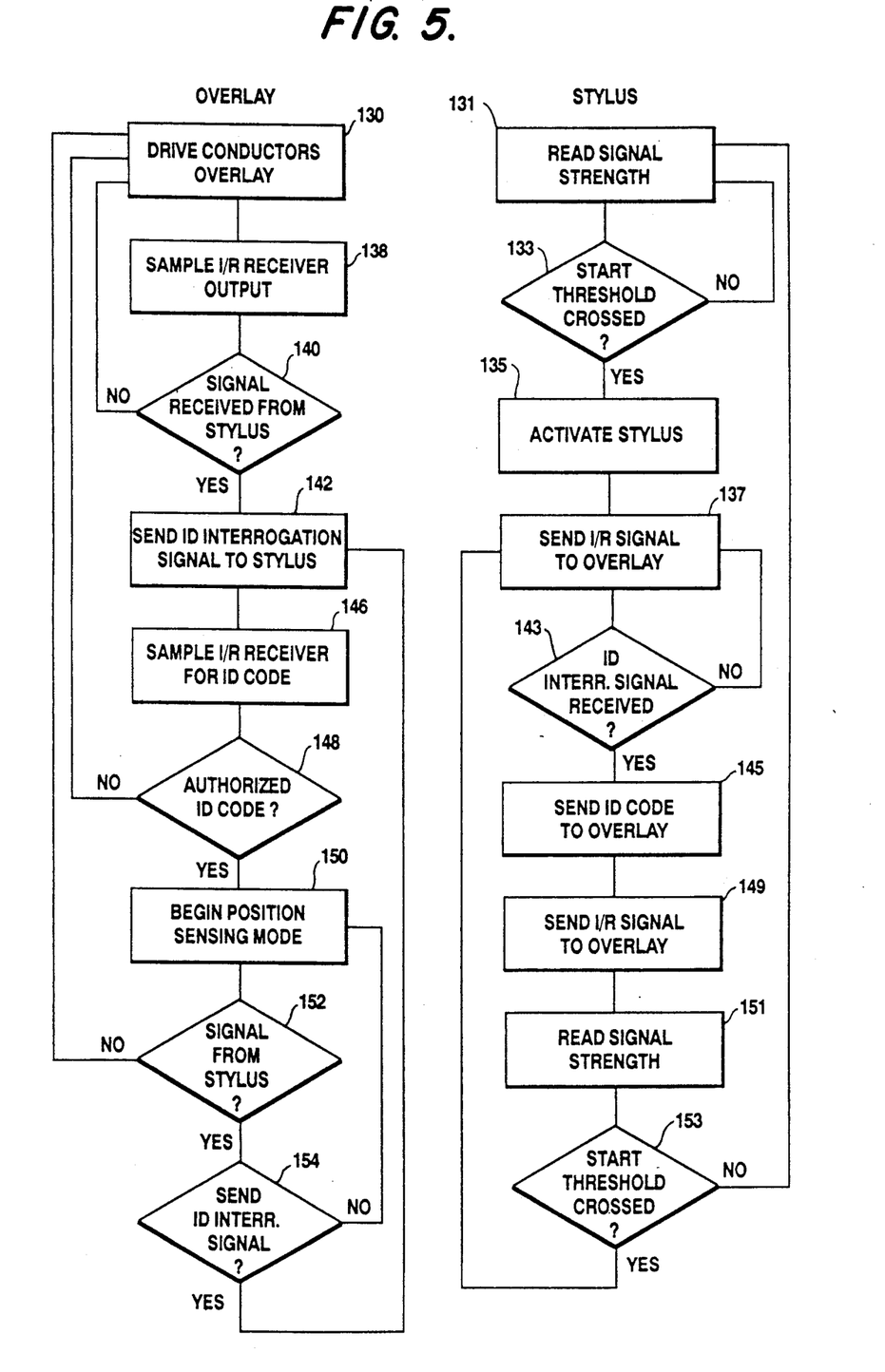
FIG. 5 is a flow chart of the operation of the invention when using the transparent overlay in conjunction with an infrared transmitter.

FIG. 5 is a flow diagram of one embodiment of the interaction between the infrared stylus 60 and remainder of the input system which is coordinated by control processor 94. In FIG. 5, all steps taken by the stylus 60 are denoted by odd numerals, those taken by the control processor are denoted by even numerals.

Initially, the control processor is in a proximity scan mode where only the X conductors in the overlay are driven in 40 Khz signal bursts, as shown by step 130. Meanwhile, in step 131, the stylus 60 is in a quiescent mode where most components are deactivated. However, where a signal of sufficient strength has been reached in step 133, the stylus 60 activates and an infrared signal is sent to the infrared receiver 80 in the input system, step 137. The signal sent in step 137 mimics the electromagnetic signal sent by the overlay 20, which in the case of the proximity scan mode of step 130 would contain no information about the position of the stylus 60 in the X-Y plane defined by the overlay 20.

The control processor is continuously sampling the output of the infrared receiver 80 in steps 138 and 140. If no signal is received from the stylus 60, it continues in proximity scan mode in step 130. If a stylus signal is received, an identification interrogation signal is sent in step 142 via the overlay conductors.

Once the identification interrogation signal is received by the stylus 60, the code generator 127 sends a unique ID code which identifies the stylus 60 and its user in step 145. Once the ID code is received by the infrared receiver 80, the control processor 94 evaluates the stylus ID. If it is an authorized ID code, stylus position sensing mode, locate stylus and track stylus, is initiated in step 152.

Both the stylus 60 and control processor 94 monitor for the presence of signal from the other. If the signal received from the overlay 20 by the stylus does not exceed the start threshold level steps 151 and 153, the stylus is inactivated and returned to its quiescent state represented by step 131. If no stylus signal 78 is received, the control processor 94 returns the input system to the proximity scan mode of step 130. If the stylus signal 78 is returned the input system remains in position sensing mode, unless a periodic ID interrogation signal, step 154, is called for by the programming of the control processor 94. Periodic polling of the remote stylus 60 adds to the overall security of the data processing system.

One advantage of the infrared embodiment of the invention described above is that few changes are required to the preexisting input system described in U.S. Pat. No. 4,686,332 to accommodate an infrared stylus. The only changes required are infrared receiver 80 and signal decoder 82, and relatively modest software changes 101, 102 and 103. However, a distinct disadvantage is that an infrared transmission is fairly directional and the transmitting antenna on the stylus and the receiving antenna at the work station must be well aligned. The user's hand can easily obscure the infrared stylus signal causing difficulty in gaining access to and inputting data to the host processor.

Figure 6:
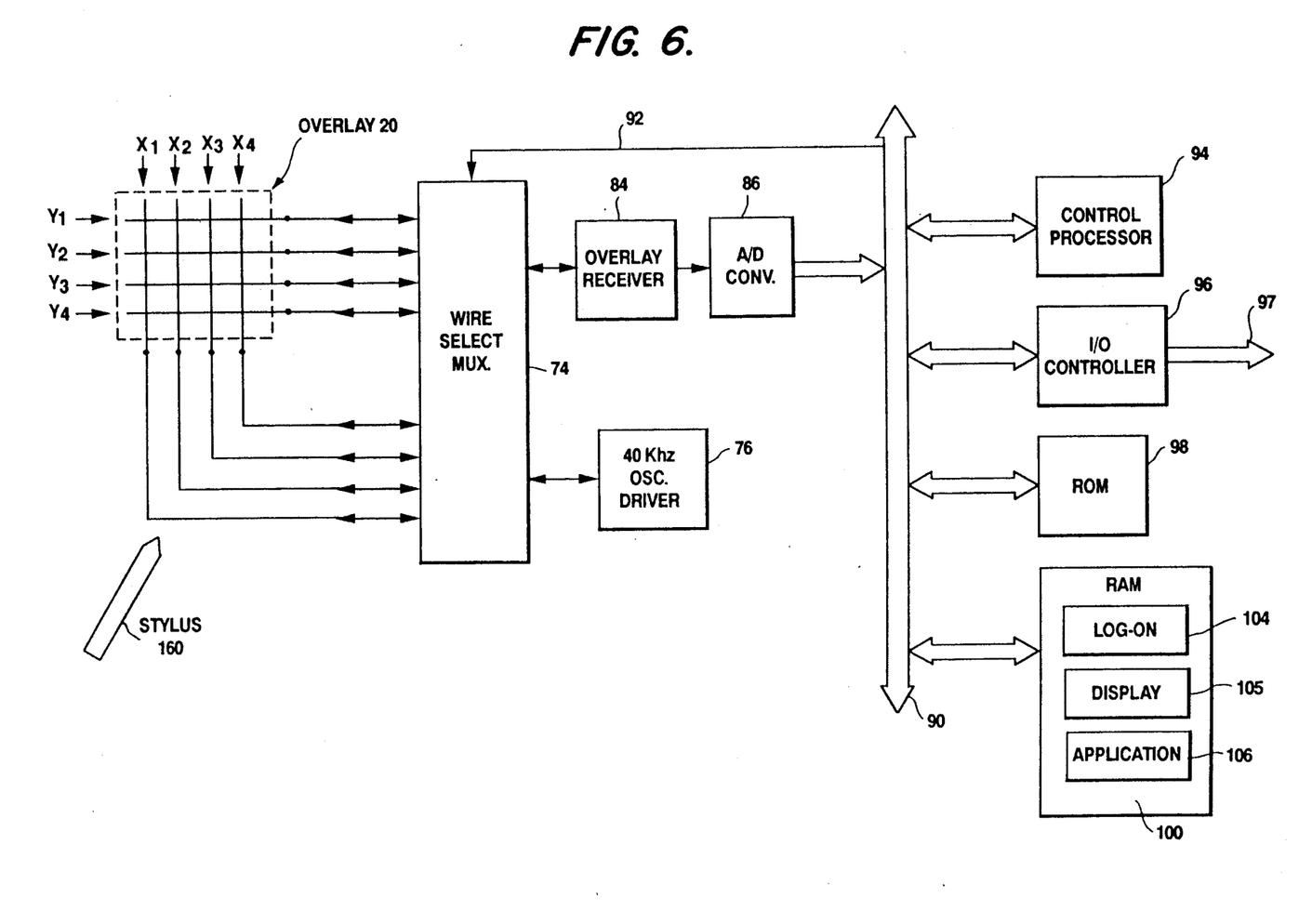
FIG. 6 is an architectural diagram of the functional elements of the input system using a transparent overlay as an antenna to receive signals from a microwave or RF transmitter on the personal stylus.

An alternative embodiment is shown in FIG. 6 which is an architectural diagram of an input system in which conductors of the overlay 20 are used as an antenna to receive electromagnetic signals such as radio or microwave frequency waves from the stylus 130. The input system depicted in FIG. 6 is quite similar to that depicted for the infrared embodiment in FIG. 3, with the addition of an overlay receiver 84 connected between the wire select multiplexer 74 and the processor address/data bus 90, and changes to the stylus 160 to enable it to send signals in the electromagnetic spectrum. Minor changes in the log-on procedure 104 and display control 105 software are also necessary. The electromagnetic transmitting stylus 160 receives the 40 Khz signals emitted from the overlay 20 for stylus location detection. The stylus 160 will then transmit stylus identification and amplitude information used to determine stylus location on a much higher frequency carrier, approximately 100-300 Khz on a frequency shift keying signal, back to the overlay 20. The input system detects the high frequency carrier by an overlay receiver 84 connected to the overlay conductors via the wire select multiplexer 74. Separation of the signals from the overlay MA9-87-013 receiver 84 would be accomplished by standard frequency discrimination circuitry.

Figure 7:
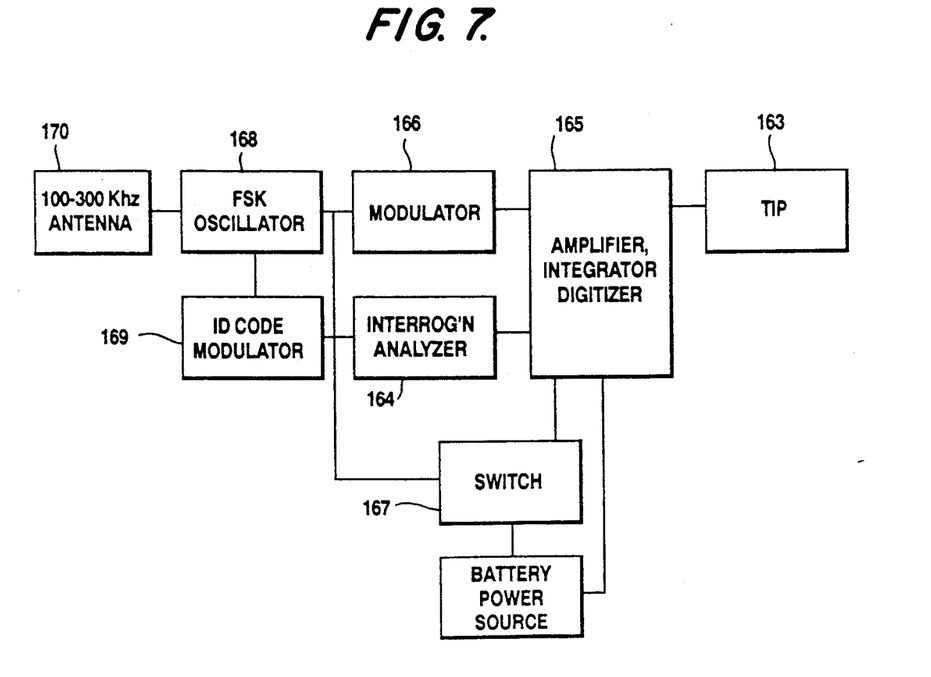
FIG. 7 is an architectural diagram of the functional elements of the personalized stylus in the RF embodiment.

Referring to FIG. 7, the electromagnetic remote stylus 160 is discussed in greater detail. The stylus 160 functions very similarly to the infrared embodiment above; the electromagnetic remote stylus 160 is also a transponder, remaining quiescent until it detects a proximity scan signal greater than a threshold level from the overlay 20. The successive 40 Khz bursts in overlay signal are detected by the 40 Khz antenna in the stylus tip 163 and sent to the amplifier/integrator/digitizer 165 which is the only stylus component which remains powered constantly. When the distance between the stylus 160 and overlay 20 become small enough, the stylus 160 receives signal amplitudes greater than an enabling threshold and activates the inactive stylus components. The switch 167 is activated by a threshold detector once a predetermined enabling signal amplitude is detected.

When the stylus 160 is powered, successive in coming bursts of the the 40 Khz are integrated and digitized by the amplifier integrator digitizer 162. The digitized amplitude value of each burst is sent to the overlay receiver 84 by the modulated carrier signal (100–300 Khz) produced by the modulator 166 and the frequency shift keying oscillator 168 and sent by the 100–300 Khz antenna 170 during the interval following each 40 Khz burst.

When the first stylus response, i.e., that following the 40 Khz burst that exceeded the enable threshold, is received by the overlay receiver 84, an ID interrogation signal is sent from the overlay 20 to the stylus 160. When the interrogation signal is received by the stylus 160 it is recognized by the interrogation code analyzer and a unique 30 bit identification code permanently stored in the stylus ID code modulator 169 is transmitted to the overlay receiver 84 via the 100–300 Khz signal. The control processor 94 evaluates the stylus ID. If it is an allowed stylus code, the user is logged on to the system and information processing can begin. The control processor 94 can also be programmed to interrogate the stylus 41 periodically during a session to validate proper stylus operation as well as stylus identity.

The digitized amplitude values that are sent to the overlay receiver 84 are equivalent to the values produced by the analog converter of the input system of the above incorporated Greanias, et al. patent. Therefore, only minor changes are required in the overlay programming for the determination of stylus position.

The frequency shift keying signal from the stylus 160 to overlay 20 has an effective bandwidth of 80 Khz. The 30 bit identification code, plus header, requires approximately 720 microseconds to complete, or about 60 cycles of communication bandwidth. This is substantially less than the 9600 microseconds required for the overlay 20 to complete one locate cycle for the location of the stylus 160. Therefore, any delay in transition from proximity to locate would not be noticeable to the user.

After the stylus ID has been properly validated, the control processor 94 initiates position sensing. The overlay 20 transmits preset patterns of 40 Khz bursts, first for "locate" and then for "track", from the appropriate x and y conductor groupings. The transmission period for the digitized amplitude values from the stylus 160 will be about 200 microseconds. The shortest period between successive 40 Khz bursts is in "track" mode, 475 microseconds. Each burst takes 125 microseconds, leaving a 350 microsecond interval for transmission. These timings correspond to stylus location sampling of 285 points per second which greatly exceeds the requirements for good reproduction of normal handwriting.

Figure 8:
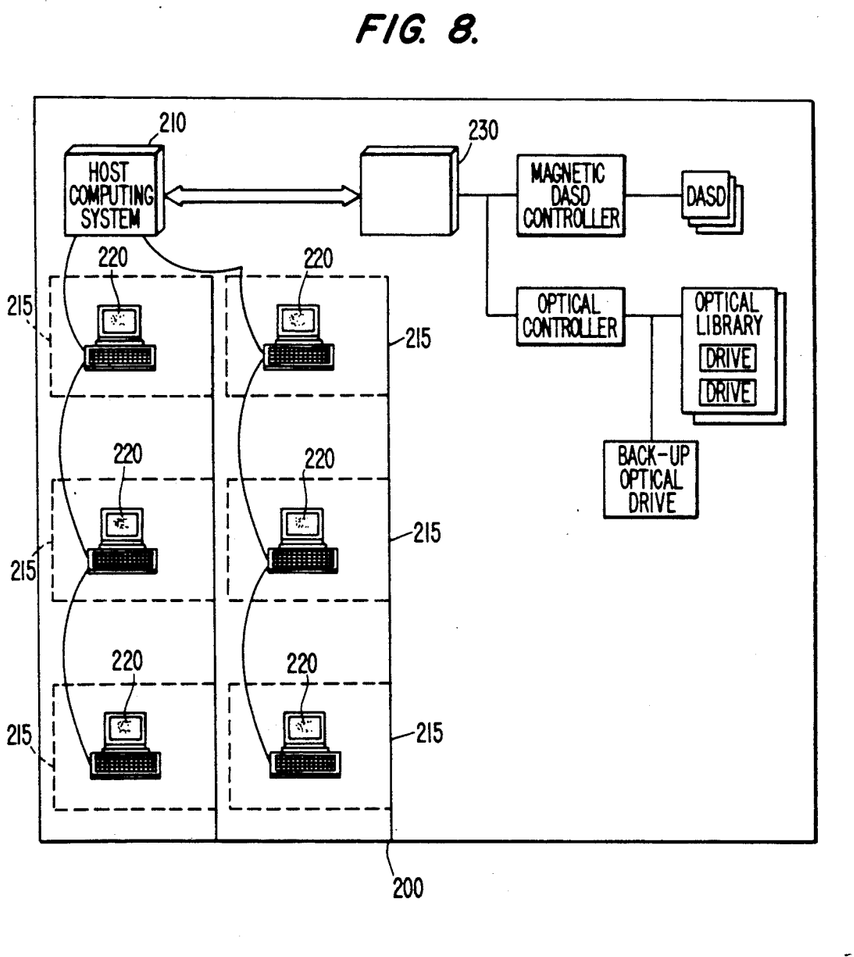
FIG. 8 is a diagram of data processing system having multiple workstations connected to a host computer system to which access is controlled according to the present invention.

FIG. 8 depicts a data processing system 200 such as might be found at a hospital or manufacturing facility to which access is controlled according to the present invention. The host computing system 210, for example an IBM 3090, is connected to a plurality of individual workstation 215 each of which are equipped with an input system having an overlay 220 capable of emitting electromagnetic signals to a remotely sensed personal stylus (not shown). Each user can gain access to the host computer system by touching his personal stylus to the overlay 220 of any of the individual workstations 215. The data processing system in FIG. 8 further comprises a second large processor 230 which coordinates the storage of information between the magnetic DASD controller 232 and its associated DASD 234 and the optical storage controller 240 and its associated optical library 242 and back-up optical drive 244.

Although the specific embodiments of the invention have been disclosed, it will be understood by those of skill in the art that the changes in form and detail may be made without departing from the spirit and scope of the invention.

We claim:

1. A data processing system having at least one workstation equipped with an input system which controls access to said data processing system by validating a security code transmitted by a remotely sensed personal stylus, comprising:

said input system comprising:
radiating means having a control input for radiating electromagnetic signals in an area proximate to said input system;
a remotely sensed personal stylus located separate from, but proximate to said workstation, for receiving electromagnetic signals radiated from said radiating means and for transmitting response signals and a security code signal in response thereto, said stylus including a receiving antenna, a means for providing a security code signal and a transmitter;
receiving means having an output for receiving transmission from said remotely sensed personal stylus;
a control processor coupled to said control input of said radiating means for executing a sequence of stored program instructions to output control signals, said control processor coupled to said receiving means for sampling said stylus transmissions to determine stylus location and to receive said security code signal;
program instructions including a log-on module which validates said unique coded signal to allow access to said data processing system;
a central processing unit having a data input coupled to said receiving means which executes a sequence of program instructions in response to data supplied by said stylus transmissions; and,
a workstation display device coupled to said central processing unit for displaying the results of said program instructions to the user.

2. The date processing system as recited in claim 1, wherein said radiating means comprises:
an array of horizontal and vertical conductors for radiating electromagnetic signals;

a radiative signal source coupled to said conductors, for driving said horizontal and vertical conductors; and, a selection means coupled to said conductors and said source and having a control input, for connecting selected patterns of said horizontal and vertical conductors to said radiative signal source.

3. The data processing system as recited in claim 2 wherein said transmitter of said remotely sensed personal stylus is a microwave transmitter, and said receiving means includes an array of horizontal and vertical conductors.

4. The data processing system as recited in claim 3 wherein said security code signal is associated with data entered into said data processing system by the user of the stylus.

5. The data processing system as recited in claim 2 wherein said array of horizontal and vertical conductors is arranged on the viewing surface of said workstation display device.

6. The data processing system as recited in claim 1 where said input system further comprises a signal decoding means coupled to said receiver output for decoding said stylus transmissions, said signal decoding means output coupled to said control processor.

7. The data processing system as recited in claim 1 wherein said transmitter of said remotely sensed personal stylus is an infrared transmitter, and said receiving means is an infrared receiver.

8. The data processing system as recited in claim 1 wherein said transmitter of said remotely sensed personal stylus is a radio frequency transmitter, and said receiving means includes said array of horizontal and vertical conductors.

9. The data processing system as recited in claim 1 wherein said security code signal is a unique code which identifies the user of the stylus.

10. The data processing system as recited in claim 1 which further comprises:
 a plurality of workstations connected to said central processing unit each equipped with an input system which controls access to said data processing system;
 magnetic storage devices to provide permanent storage for program instructions executable by said central processing unit; and,
 a storage processor to coordinate the storage of information in said magnetic storage devices.

11. The data processing system as recited in claim 10 which further comprises optical storage devices to provide permanent storage for said data processing system, wherein said storage processor coordinates the storage of information in said optical devices.

12. The date processing system as recited in claim 1, wherein said log-on module is resident at said input system.

13. An input system for controlling access to a data processing system by validating an authorized security code transmitted by a remotely sensed personal stylus comprising:
 radiating means having a control input for radiating electromagnetic signals in an area proximate to said input system;
 a remotely sensed personal stylus located separate from, but proximate to said workstation for receiving electromagnetic signals radiated from said radiating means and for transmitting response signals and a coded security signal in response thereto, said stylus having a receiving antenna, a means for providing a security code signal and a transmitter;
 receiving means having an output for receiving transmissions from said remotely sensed personal stylus; and
 a control processor coupled to said control input of said radiating means for executing a sequence of stored program instructions to output control signals and coupled to said receiving means for sampling said stylus transmissions to determine stylus location and to receive said coded security signal.

14. The input system as recited in claim 13, wherein said radiation means comprises:
 an array of horizontal and vertical conductors for radiating electromagnetic signals;
 a radiative signal source coupled to said conductors, for driving said horizontal and vertical conductors; and
 a selection means coupled to said conductors and said source and having a control input, for connecting selected patterns of said horizontal and vertical conductors to said radiative signal source.

15. The input system as recited in claim 14 wherein said transmitter of said remotely sensed personal stylus is a radio frequency transmitter, and said receiving means includes said array of horizontal and vertical conductors.

16. The input system as recited in claim 14 wherein said array of horizontal and vertical conductors is arranged on the viewing surface of said workstation display device.

17. The input system as recited in claim 13, which further comprises a signal decoding means coupled to said receiving output for decoding said stylus transmissions, said signal decoding means output coupled to said control processor.

18. The input system as recited in claim 13 which further comprises program instructions including a log-on module which validates said unique coded signal to allow access to said data processing system.

19. The input system as recited in claim 13 wherein said transmitter of said remotely sensed personal stylus is an infrared transmitter, and said receiving means is an infrared receiver.

20. The input system as recited in claim 13 wherein said transmitter of said remotely sensed personal stylus is a microwave transmitter, and said receiving means includes said array of horizontal and vertical conductors.

21. The input system as recited in claim 13 wherein said security code signal is a unique code which identifies the user of the stylus.

22. The input system as recited in claim 21 wherein said security code signal is associated with data entered into said data processing system by the user of the stylus.

23. A remotely sensed personal stylus for use with an input system having radiating means for radiating electromagnetic signals and receiving means for receiving transmissions from said remotely sensed stylus, comprising:
 an antenna for receiving electromagnetic signals radiated from said radiating means;
 means for providing a security code signal;
 a transmitter for sending response signals to said input system in response thereto;

whereby access to a data processing system is controlled by said input system by validating said security code.

24. The remotely sensed personal stylus as recited in claim 23, wherein said radiating means comprises an array of horizontal and vertical conductors coupled to a radiative signal source.

25. The remotely sensed stylus as recited in claim 24 wherein said transmitter of said remotely sensed personal stylus is a radio frequency transmitter, and said receiving means includes said array of horizontal and vertical conductors.

26. The remotely sensed personal stylus as recited in claim 25, which further comprises a battery power source and a switch which activates selected components when said electromagnetic signals received by said antenna are greater than a threshold level indicating that said stylus is within operating distance of said input system.

27. The remotely sensed personal stylus as recited in claim 24 wherein said transmitter of said remotely sensed personal stylus is a microwave transmitter, and said receiving means includes said array of horizontal and vertical conductors.

28. The remotely sensed stylus as recited in claim 23 wherein said transmitter of said remotely sensed personal stylus is an infrared transmitter, and said receiving means is an infrared receiver.

29. The remotely sensed personal stylus as recited in claim 23 wherein said security code signal is a unique code which identifies the user of the stylus.

30. The remotely sensed personal stylus as recited in claim 23, which further comprises a signal amplifier for increasing the signal strength of electromagnetic signals received from said radiating means.

31. The remotely sensed personal stylus as recited in claim 23, which further comprises a signal modulator for modulating electromagnetic signals received from said radiating means.

32. A method of controlling access to a computer equipped with an input system which validates a security code transmitted by a remotely sensed personal stylus, said input system having a radiating means for radiating electromagnetic signals and receiving means for receiving transmissions from said remotely sensed stylus, comprising the steps of:
   activating said stylus within operating distance of said radiating means;
   transmitting a security code signal which identifies said stylus as an authorized user to said receiving means;
   validating said security code signal against authorized security codes; and,
   granting access to said computer if said security code signal is an authorized security code.

33. The method of controlling access to a computer as recited in claim 32, wherein said activating step is initiated in response to said stylus receiving an electromagnetic signal of a predetermined strength from said radiating means.

34. The method of controlling access to a computer as recited in claim 32, wherein said transmitting step is initiated in response to an identification interrogation signal received by said stylus.

35. The method of controlling access to a computer as recited in claim 34, which further comprises the step of periodically interrogating said stylus with an identification interrogation signal to obtain a retransmission of said security code.

36. The method of controlling access to a computer as recited in claim 32, which further comprises the step of locating the position of said stylus if access to the computer has been granted.

37. The method of controlling access to a computer as recited in claim 32, which further comprises the steps of:
   inputting data to said computer corresponding to the position of said stylus; and
   associating said security code with the data inputted.

* * * * *